(12) United States Patent
Wong et al.

(10) Patent No.: US 8,970,571 B1
(45) Date of Patent: Mar. 3, 2015

(54) APPARATUS AND METHOD FOR DISPLAY LIGHTING ADJUSTMENT

(75) Inventors: Adrian Wong, Mountain View, CA (US); Russell N. Mirov, Los Altos, CA (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 13/419,299

(22) Filed: Mar. 13, 2012

(51) Int. Cl.
G09G 5/00 (2006.01)

(52) U.S. Cl.
USPC .......................................... 345/207

(58) Field of Classification Search
None
See application file for complete search history.

(56) References Cited

U.S. PATENT DOCUMENTS

| 4,711,512 | A | 12/1987 | Upatnieks |
| 5,076,664 | A | 12/1991 | Migozzi |
| 2004/0080467 | A1* | 4/2004 | Chinthammit et al. ........... 345/7 |
| 2006/0097978 | A1* | 5/2006 | Ng et al. ....................... 345/102 |
| 2010/0149073 | A1* | 6/2010 | Chaum et al. .................... 345/8 |
| 2011/0018903 | A1* | 1/2011 | Lapstun et al. ................ 345/633 |
| 2011/0213664 | A1 | 9/2011 | Osterhout et al. |
| 2014/0063055 | A1* | 3/2014 | Osterhout et al. ............ 345/633 |

* cited by examiner

*Primary Examiner* — Adam R Giesy
*Assistant Examiner* — Henok Heyi
(74) *Attorney, Agent, or Firm* — Blakely Sokoloff Taylor & Zafman LLP (57) ABSTRACT

An apparatus includes a light source, a display array, a light relay, a photodetector, control circuitry, and measurement circuitry. The light source is for providing lamp light during an ON-time of the light source. The display array is positioned to receive and selectively manipulate the lamp light. The light relay is positioned to receive the image light from the display array. The photodetector is optically coupled to receive light. Control circuitry is coupled to the light source for cycling the light source and coupled to the measurement circuitry for coordinating light measurements of the photodetector.

19 Claims, 7 Drawing Sheets

APPARATUS AND METHOD FOR DISPLAY LIGHTING ADJUSTMENT

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for adjusting lamp light for a display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
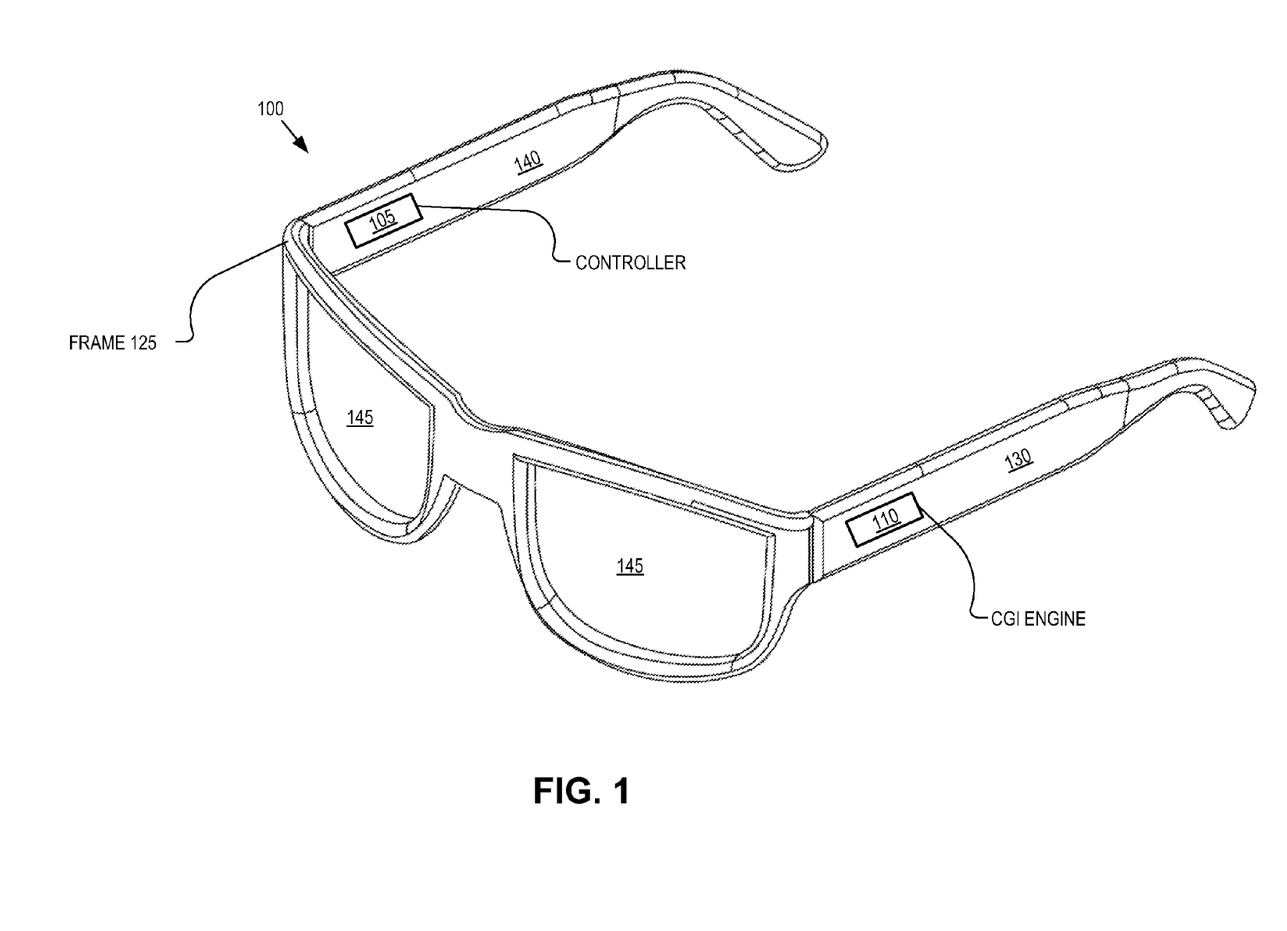
FIG. 1 is a perspective view of example wearable glasses that contain electronic components to facilitate human-computer interaction, in accordance with an embodiment of the disclosure.

FIG. 1 is a perspective view of example wearable glasses 100 that contain electronic components to facilitate human-computer interaction, in accordance with an embodiment of the disclosure. The illustrated embodiment of wearable glasses 100 includes lenses 145 disposed in frame 125 that includes left temple arm 130 and right temple arm 140. Although FIG. 1 illustrates a traditional eyeglass frame 125, embodiments of the present invention are applicable to a wide variety of frame types and styles (e.g. visor, headband, goggles). Lenses 145 may or may not be corrective lenses with optical power in some embodiments. In some embodiments, no lenses are present and the optical and electronic systems and methods of this disclosure are used to display CGI light to the eye of a user of an HMD that does not utilize a traditional glasses frame.

Wearable glasses 100 may include a controller 105 disposed in right temple arm 140 and a computer generated image ("CGI") engine 110 disposed in left temple arm 130. Controller 105 and CGI engine 110 may be disposed in other locations in wearable glasses 100. Controller 105 may include an integrated circuit with hardware, firmware, or software logic. CGI engine 110 may include a processor and graphics engine for rendering image data. In one embodiment, controller 105 and CGI engine 110 are combined in one integrated-chip, or even on the same semiconductor die. Controller 105 may be used to receive, transmit, and process data and communicate with CGI engine 110. CGI engine 110 may generate images for displaying to the eye of a user. In one embodiment, CGI engine 110 is not located on an HMD, rather display generation data is sent to the HMD from a CGI engine or display generator that is not worn on a head of the user. CGI engine 110 may be located on a device configured to be worn on a belt of a user, or otherwise.

Figure 2:
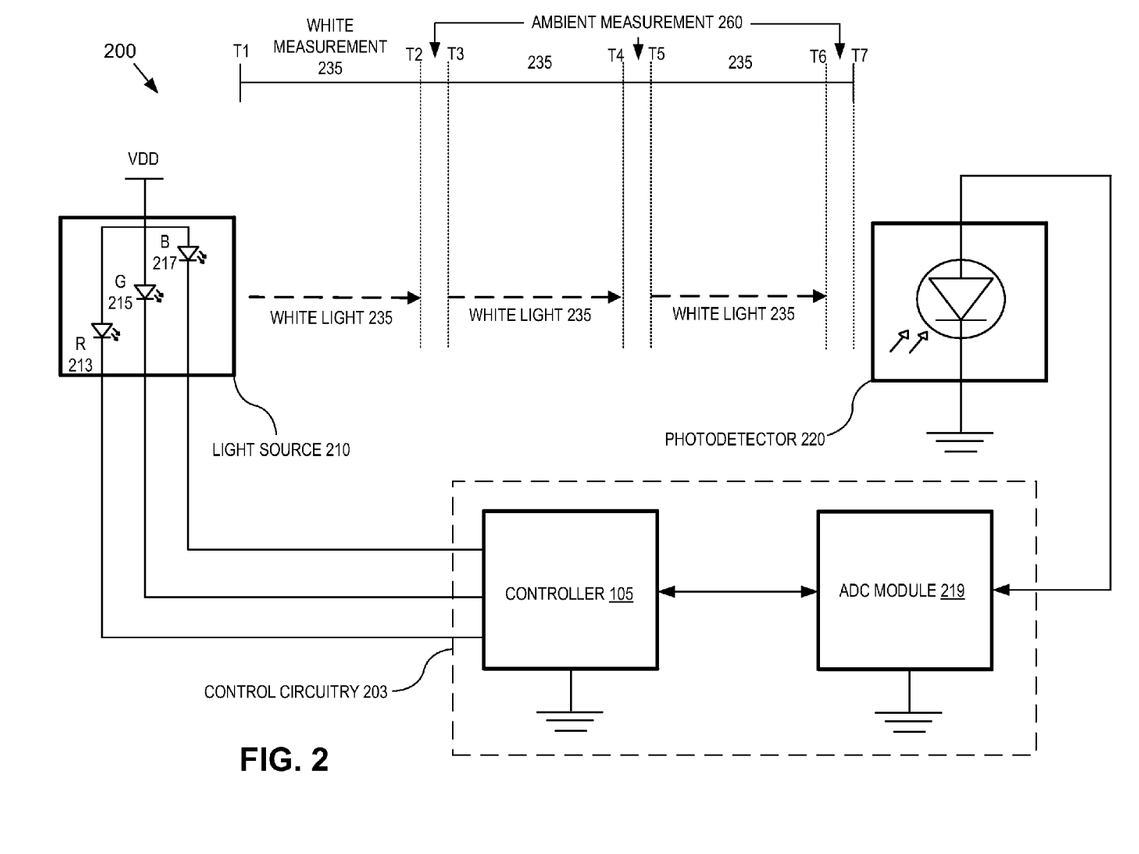
FIG. 2 is an example schematic block diagram of a system and corresponding timing diagram that may be integrated into an HMD, in accordance with an embodiment of the disclosure.

FIG. 2 is an example schematic block diagram of system 200 and corresponding timing diagram that may be integrated into an HMD, in accordance with an embodiment of the disclosure. System 200 is capable of adjusting the brightness of a light source 210 based on ambient light measurements from photodetector 220. In an HMD context, system 200 may measure the ambient light external to the HMD and adjust an emission-time of white lamp light 235 so that CGI light generated by a display using white lamp light 235 has the correct brightness when it is directed into an eye of a user. For example, in an outdoor environment, the CGI light may be displayed relatively bright. In an indoor environment, the CGI light may be displayed relatively dim.

FIG. 2 illustrates controller 105 coupled to a red, green, and blue light emitting diode ("RGB LED"), which is the illustrated embodiment of light source 210 that provides white lamp light 235 to a display (not shown). The illustrated RGB LED is just one example of possible light sources that could provide white lamp light 235 to a display, in accordance with an embodiment of the disclosure.

Light source 210 could include lasers, bulbs, or other technology that could provide white lamp light 235 to a display. The illustrated RGB LED is shown as having red LED 213, green LED 215, and blue LED 217 contained in one package. However, light source 210 could include individual (discrete) red, green, and blue LEDs. Light source 210 may include more than one red, green, and blue LED configured in series or parallel. Light source 210 may include white LEDs or two colors of LEDs (e.g. red and white). Light source 210 may also include a white LED or a plurality of white LEDs in combination with RGB LEDs. It is appreciated that in the case of an RGB LED configured to emit white light, the red, green, and blue LED are driven at the same time and the RGB light emitted by the RGB LED optically mixes to provide white light. Specific electronic drivers to modulate light source 210 are not shown in FIG. 2. However, driver circuits that individually control both the current flowing through each individual LED and further modulate each LED according to separate pulse width modulation signals are possible to increase the dimming range and resolution of system 200. Other drive circuit configurations (e.g. voltage controlled) are possible.

Control circuitry 203 may include controller 105 and an analog-to-digital converter ("ADC") module 219 coupled to controller 105. It is appreciated that controller 105 and ADC module 219 may be contained in the same semiconductor package or even on the same semiconductor die. For example, controller 105 may be a processor that includes on-board ADC module 219. If ADC module 219 is its own electronic component, it may communicate with controller 105 with a serial protocol or otherwise. In one embodiment, ADC module 219 has 10-bit resolution, but other resolutions are possible.

In the illustrated embodiment, ADC module 219 is coupled to photodetector 220. It is appreciated that filtering/conditioning circuitry (e.g. resistor and/or capacitors) could be disposed between photodetector 220 and ADC module 219. Photodetector 220 may be a photodiode (e.g. CMOS P-N photodiode) or include other technology. Photodetector 220 may be an array of photodetectors. In one embodiment, photodetector 220 includes a first, second, and third photodiode with a red, green, and blue filter disposed over each photodiode, respectively. In one embodiment, photodetector 220 is not positioned to receive white lamp light 235, but is positioned to receive ambient light. In one embodiment, photodetector 220 is positioned to receive white lamp light 235 and ambient light.

FIG. 2 also illustrates a timing diagram that shows light source 210 providing white lamp light 235 during ON-times of light source 210. In the illustrated embodiment, the ON-times of light source 210 are between time T1 and T2, between time T3 and T4, and between time T5 and T6. It appreciated that "ON-times" may include the light source being strobed within the "ON-time" (e.g. LEDs may be driven by Pulse Width Modulation having a duty cycle during ON-times) White lamp light 235 is provided to a display array (not shown) that is positioned to receive and selectively manipulate white lamp light 235 to generated CGI light. In the illustrated embodiment, the OFF-times of light source 210 are between time T2 and T3, between T4 and time T5, and between T6 and time T7.

Controller 105 coordinates an ambient light measurement 260 with an OFF-time of light source 210. For example, controller 105 may drive light source 210 to provide white light from time T1 to time T2. Between time T2 and T3, controller 105 may hold light source 210 OFF and coordinate an ambient light measurement 260 between time T2 and T3. Coordinating ambient light measurement 260 may include instructing ADC module 219 to measure an output signal of photodetector 220 during an OFF-time of light source 210. If photodetector 220 is a photodiode, the photodiode may generate a current in response to the amount of ambient light incident on the photodiode. The current generated by the photodiode may generate a voltage on a resistor and that analog voltage may be measured by ADC module 219 and conveyed to controller 105.

Controller 105 may adjust an ON-time of light source 210 based on ambient light measurement 260. Controller 105 may store the ambient light measurement 260 in a memory and change (or not change) the ON-time of light source 210. In one embodiment, controller 105 coordinates a second ambient light measurement 260 (e.g. between time T4 and T5) and averages the second ambient light measurement 260 and the previous ambient light measurement. Controller 105 may determine an ON-time of light source 210 based on multiple ambient light measurements 260 compared to an algorithm, equation, or data table stored in memory. The algorithm, equation, or data table may be generated according to calibration measurements taken by photodetector 220.

In addition to adjusting the ON-time of light source 210 based on ambient light measurement(s) 260, controller 105 may adjust the ON-time of light source 210 based on white light measurement(s) 230. It is appreciated that white light measurement(s) 230 may include measuring ambient light in addition to white lamp light 235. However, the ambient light portion of white measurement 230 can be subtracted out (e.g. by controller 105) by reducing white measurement 230 by ambient light measurement 260 to attain a more accurate measurement of white lamp light 235.

Figure 3:
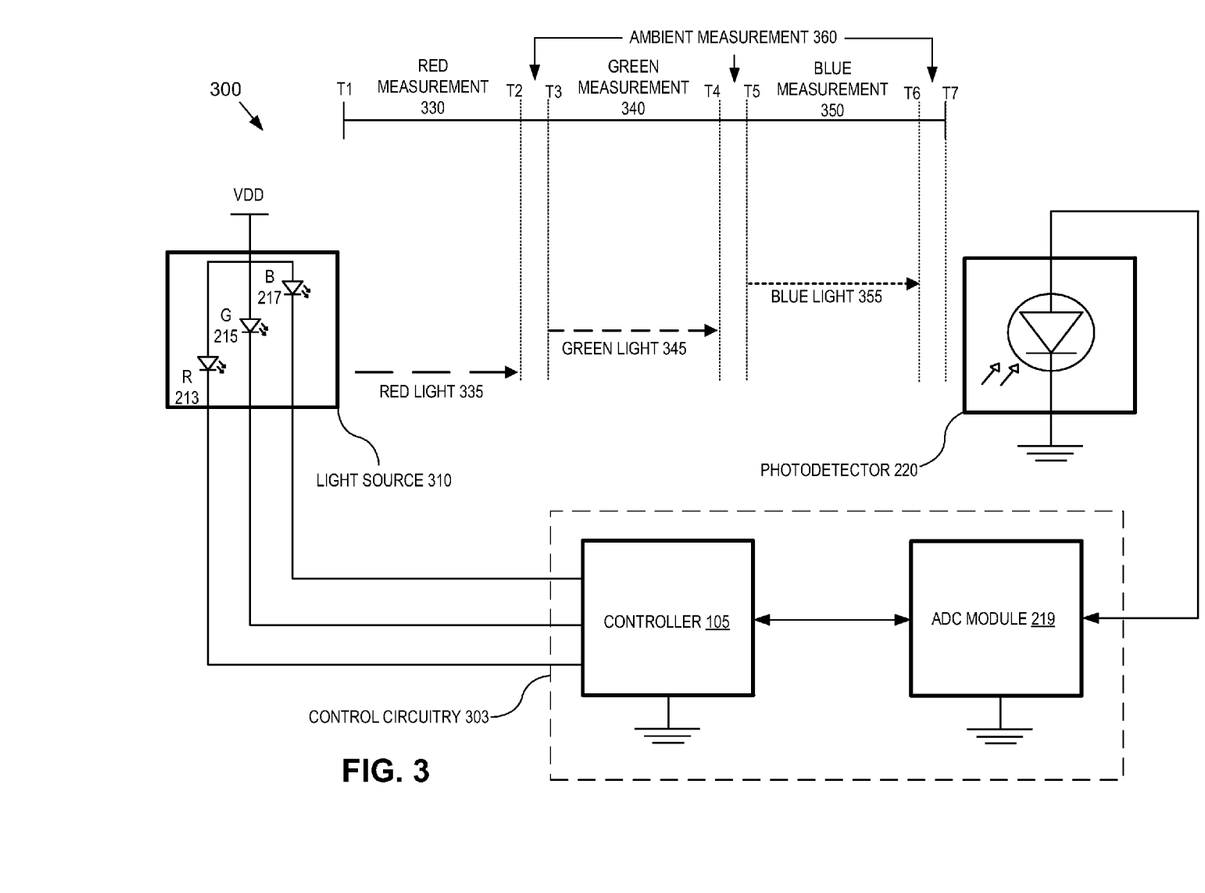
FIG. 3 is an example schematic block diagram of a system and corresponding timing diagram that may be integrated into an HMD, in accordance with an embodiment of the disclosure.

FIG. 3 is an example schematic block diagram of system 300 and corresponding timing diagram that may be integrated into an HMD, in accordance with an embodiment of the disclosure. System 300 is capable of color balancing light source 310 based on light measurements of individual light colors (e.g. RGB) provided by light source 310. In an HMD context, system 300 may individually measure red light 335, green light 345, and blue light 355 and adjust the length of time each color light is provided to a display so that CGI light generated by the display has the correct color balance when it is directed into an eye of a user.

FIG. 3 illustrates controller 105 coupled to a red, green, and blue light emitting diode ("RGB LED"), which is the illustrated embodiment of light source 310. Light source 310 is capable of individually providing three different light colors to a display (not shown). Controller 105 may coordinate manipulating pixels of the display with sequentially providing the three different color lights to generate a color sequential image. The illustrated RGB LED is just one example of possible light sources that could individually provide three different colors (that may combine as white light), in accordance with an embodiment of the disclosure. In one embodiment light source 310 includes a cyan, magenta, and yellow LED. Light source 310 could include lasers, bulbs, or other technology capable of individually providing three different colors that can be optically combined to form color images.

The illustrated RGB LED is shown as having the red, green, and blue LED contained in one package. However, light source 310 could include individual (discrete) red, green, and blue LEDs.

Color balancing light source 310 with a closed loop system allows light source 310 to maintain approximately the same white point by color balancing three different light colors. When light source 310 includes LEDs, system 300 can assist in creating color balanced light with the proper intensities despite variables that cause LEDs to emit light of different intensities.

LED light can be affected by manufacturing differences, junction temperature, lifetime degradation, and otherwise. Some LED manufactures attempt to correct for manufacturing differences in same part number LEDs by "binning" LEDS according to color, efficiency, or other characteristics. However, "binning" can only homogenize LEDs so much and optical feedback may still be required to generate the desired output. Furthermore, LED junction temperature can affect the efficiency of an LED. Since the junction temperature may change depending on lamp light brightness or ambient temperatures, closed loop systems may be useful in generating the desired LED output over the changing junction temperature. The lifetime of LEDs may also affect their performance. LED efficiency may degrade depending on their hours of operation. Since different color LEDs may experience efficiency degradation at different rates, optical feedback may be needed to maintain the desired color balance and intensity. System 300 may assist in mitigating these variable and other variables that affect intensities and color balancing for display lamp light.

In FIG. 3, control circuitry 303 may include controller 105 and ADC module 219 coupled to controller 105. In the illustrated embodiment, ADC module 219 is coupled to photodetector 220. It is appreciated that filtering/conditioning circuitry (e.g. resistor and/or capacitors) could be disposed between photodetector 220 and ADC module 219. Photodetector 220 is positioned to receive (individually) three colors of light in embodiments consistent with system 300. In the illustrated embodiment, photodetector 220 is positioned to receive red light 335, green light 345, and blue light 355. In one embodiment, photodetector 220 is positioned to receive red light 335, green light 345, blue light 355 and ambient light.

FIG. 3 also illustrates a timing diagram that shows light source 310 providing red light 335, green light 345, and blue light 355 during respective ON-times of red LED 213, green LED 215, and blue LED 217. In the illustrated embodiment, the ON-time of red LED 213 is between time T1 and time T2, the ON-time of green LED 215 is between time T3 and time T4, and the ON-time of blue LED 217 is between time T5 and time T6. The ON-times of the red LED 213, green LED 215, and blue LED 217 correspond to emission-times of red light 335, green light 345, and blue light 355, respectively. In the illustrated embodiment, the OFF-time of light source 310 is between time T2 and T3, between time T4 and T5, and between time T6 and T7. In the illustrated embodiment, red light 335, green light 345, and blue light 355 are sequentially provided to a display array (not shown) that is positioned to receive and selectively manipulate the light to generate a color sequential image.

System 300 may be applicable to color sequential displays such as color sequential Liquid Crystal on Silicon ("LCOS") arrays or liquid crystal displays ("LCD") that are configured for color sequential display. System 300 may be used to color balance color sequential displays while the color sequential displays are providing CGI light to a user. However, it is appreciated that system 300 may not be limited to color sequential display arrays and that in some circumstances, system 300 could be used to color balance lamp light for non-sequential display, as long as the display backlight or light source is capable of sequencing three colors that can optically combine to form color images. For example, during startup of a display array that is not a color sequential display, the backlight or light source could be color balanced before the backlight provides white light to the display array and images are presented to a user.

In the illustrated embodiment, controller 105 may coordinate a red light measurement 330 between time T1 and T2. For example, controller 105 may drive red LED 213 to provide red light 335 from time T1 to T2 and cause ADC module 219 to measure an output signal of photodetector 220 while red light 335 is provided. Controller 105 may then coordinate a green light measurement 340 between time T3 and T4 by driving green LED 215 to provide green light 345 and causing ADC module 219 to measure an output signal of photodetector 220 while green light 345 is provided. Controller 105 may then coordinate a blue light measurement 350 between time T5 and T6 by driving blue LED 217 to provide blue light 355 and causing ADC module 219 to measure an output signal of photodetector 220 while blue light 355 is provided. It is appreciated that different colors of light may be utilized and different measurement light sequences may be utilized to individually measure the three different colors of light.

Controller 105 may adjust an ON-time of red LED 213, green LED 215, and blue LED 217 based on red light measurement 330, green light measurement 340, and/or blue light measurement 350. It is appreciated that red light measurement 330 may include measuring ambient light in addition to red light 335. However, the ambient light portion of red light measurement 330 can be subtracted out by reducing red light measurement 330 by ambient light measurement 360 to attain a more accurate measurement of red light 335. The same ambient light subtraction may be done to attain more accurate measurements of green light 345 and blue light 355. Controller 105 may store previous red light measurements 330, green light measurements 340, and/or blue light measurements 350 in a memory. Controller 105 may determine an ON-time of red LED 213, green LED 215, and blue LED 217 based on previous red light measurements 330, green light measurements 340, and/or blue light measurements 350. In one embodiment, controller 105 averages an integer of previous light measurements to determine ON-times. Controller 105 may determine ON-times of red LED 213, green LED 215, and blue LED 217 according to a pre-determined color balance. For example, controller 105 may adjust the ON-times to achieve a color balance of approximately 20% red light 335, approximately 50% green light 345, and approximately 30% blue light 355.

In one embodiment, time T1 to T7 is one "frame" and time T1 to T3 is a red subframe, time T3 to T5 is a green subframe, and time T5 to T7 is a blue subframe. The red component of an image is generated in the red subframe, the green component in the green subframe and the blue component in the blue subframe. After display pixels of a display panel selectively manipulate the light provided in the subframes, the human eye integrates the different color light in the subframes and a user perceives an image. In order for the human eye to perceive the sequential light as one image, the frame rate must meet a minimum threshold. In one embodiment, the frame rate must be greater than 60 frames per second. In one embodiment, each subframe is 3.25 ms with a maximum ON-time of 3.0 ms and a minimum "blanking period" (where no light is emitted) of 0.25 ms. Time T2 to T3, time T4 to T5, and time T6 to T7 are example blanking periods in the illustrated embodiment. To color balance light source 310 according to a pre-determined color balance (e.g. 20% red, 50% green, 30% blue), controller 105 may increase or decrease the ON-time of a specific LED. If the ON-time of an LED is decreased, the "blanking period" may increase to fill the remainder of the example 3.25 ms subframe time.

Controller 105 may determine the color balance and intensities of light source 310 according to an algorithm, equation, or data table stored in memory. The algorithm, equation, or data table may be generated according to calibration measurements taken by photodetector 220.

In embodiments where photodetector 220 is positioned to receive three colors of lamp light and is also positioned to receive ambient light, ambient light measurements 360 may also be measured by system 300. For example ambient light measurements 360 may be taken between time T2 and T3, between time T4 and T5, and between time T6 and T7. Controller 105 may hold light source 310 OFF and coordinate an ambient light measurement 360 between time T2 and T3. Coordinating ambient light measurement 360 may include instructing ADC module 219 to measure an output signal of photodetector 220 during a "blanking period" of light source 310. Then, controller 105 may further adjust ON-times of red LED 213, green LED 215, and blue LED 217 (while still maintain proper color balancing) based on an ambient light measurement 360.

It is appreciated that even though FIG. 3 illustrates an RGB LED as the light source for color balancing, the techniques described above could pertain to a light source with colors besides red, green, and blue. The techniques described above could also pertain to light sources with more than three colors (e.g. RGB and white). In one embodiment, light source 310 includes only two colors (e.g. white and red) and the two colors are color balanced for a display.

Figure 4:
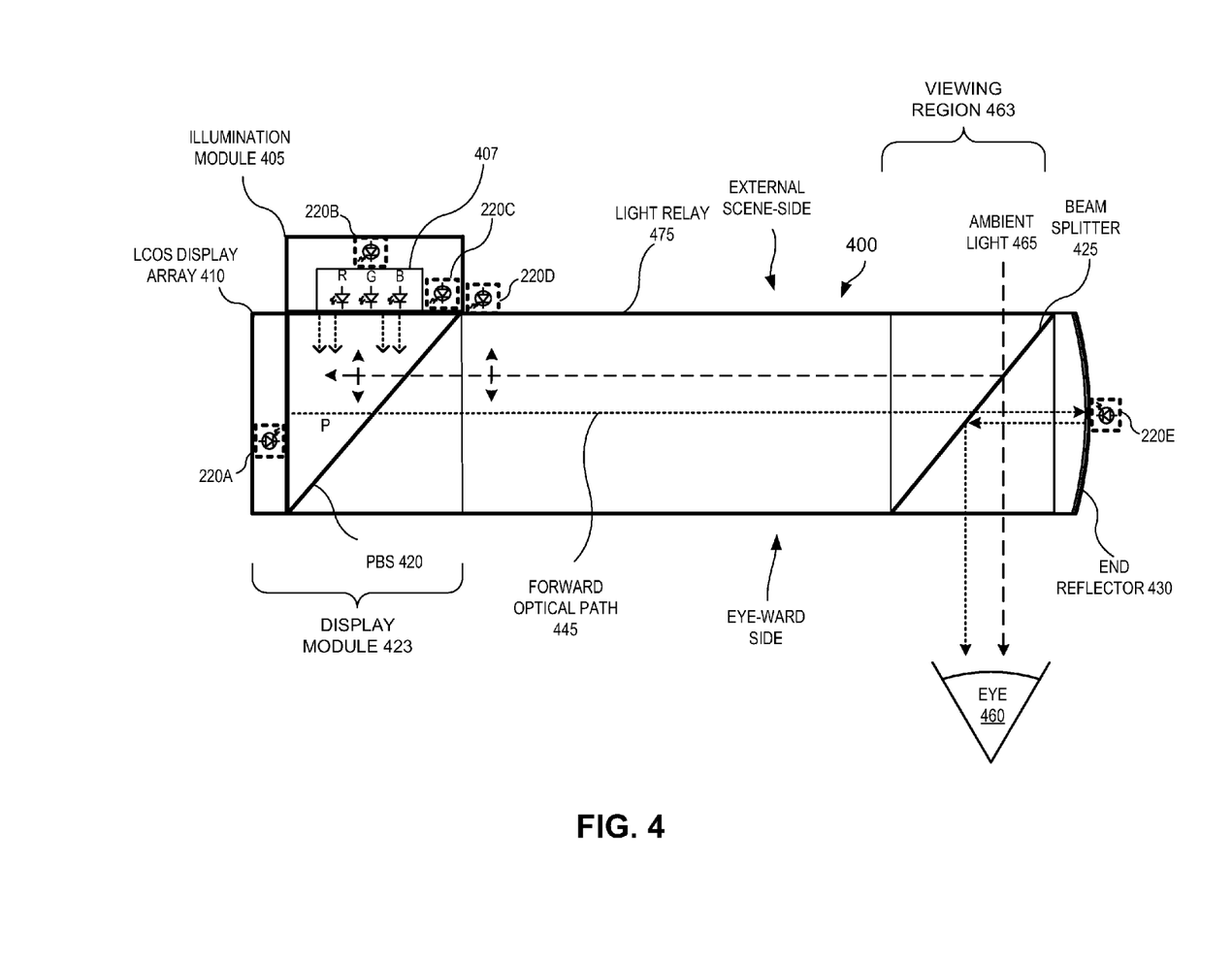
FIG. 4 is a top cross-sectional view of an eyepiece optical system, in accordance with an embodiment of the disclosure.

FIG. 4 is a top cross-sectional view of an eyepiece optical system, in accordance with an embodiment of the disclosure. Eyepiece 400 may be integrated into wearable glasses 100 or into a visor, headband or other HMD. The illustrated embodiment of eyepiece 400 includes a light relay 475 disposed between a display module 423 and a viewing region 463. Photodetectors 220A, B, C, D, and E are shown in FIG. 4 with dashed lines to indicate possible locations for photodetector 220. It is appreciated that not all of the possible photodetector locations illustrated in FIG. 4 are necessarily appropriate for each embodiment discussed in connection with FIGS. 2-3.

Display module 423 includes an illumination module 405, an LCOS display array 410, and a polarizing beam splitter ("PBS") 420. Illumination module 405 includes light source 407 which is illustrated as an RGB LED. Light source 407 may include light sources other than an RGB LED, as discussed in in connection with FIGS. 2-3. Illumination module 405 may include additional optical features (not shown) such as diffuse filters to evenly distribute the light from light source 407. Polarizing filters may be included in illumination module 405. In the illustrated embodiment, LCOS display array 410 is disposed on a side of eyepiece 400 that is approximately perpendicular to the external scene-side of eyepiece 400. However, in some embodiments LCOS display array 410 may be disposed directly across from illumination module 405. In some embodiments, display technologies other than LCOS displays (e.g. backlit LCD) may be used in place of display module 423, as discussed in connection with FIGS. 2-3.

PBS 420 is positioned to direct the lamp light emitted by illumination module 405 toward LCOS display array 410. PBS 420 passes P-polarized light and reflects S-polarized light, in the illustrated embodiment. Lamp light received by PBS 420 from illumination module 405 may be S-polarized lamp light and an S-polarizing filter may be included in illumination module 405. It is appreciated that PBS 420 could be configured to pass a different polarization orientation if corresponding adjustments were made to other components in eyepiece 400.

Light relay 475 has a transparent structure to permit CGI light generated by LCOS display array 410 to travel along forward optical path 445 to pass through light relay 475. Light relay 475 may be fabricated of a solid transparent material (e.g., glass, quartz, acrylic, clear plastic, PMMA, ZEONEX-E48R, etc.) or be implemented as a solid housing having an inner air gap through which the CGI light passes. Light relay 475 operates to receive and protect CGI light traveling along forward optical paths 445, but may not use total internal reflection ("TIR") to guide or confine the CGI light. In one embodiment (not shown), light relay 475 is curved.

Viewing region 463 includes beam splitter 425. In the illustrated embodiment, beam splitter 425 is disposed within eyepiece 400 between PBS 420 and end reflector 430. Beam splitter 425 may be a polarizing or non-polarizing beam splitter. In one embodiment, beam splitter 425 is a 50/50 beam splitter that passes 50% of light and reflects 50% of light, although other percentages are possible. Beam splitter 425 allows eye 460 to see light from the external scene-side of eyepiece 400, while beam splitter 425 is also capable of assisting in directing CGI light to eye 460 of a user of eyepiece 400. Beam splitter 425 may direct ambient light 465 from the external scene-side of eyepiece 400 into light relay 475. In one embodiment, a fixed polarization rotator is disposed between beam splitter 425 and an end reflector 430. The fixed polarization rotator may be a one-quarter wavelength rotator or a quarter waveplate, which rotates light approximately 45 degrees.

The illustrated embodiment of eyepiece 400 includes an end reflector 430. End reflector 430 is disposed at an opposite end of eyepiece 400 from display module 423. In the illustrated embodiment, end reflector 430 is a concave mirror positioned to reflect CGI light received from LCOS display array 410 via light relay 475.

In the illustrated embodiment, light displayed to eye 460 may start as S-polarized lamp light emitted from illumination module 405. Since PBS 420 passes P-polarized light and reflects S-polarized light, PBS 420 directs the S-polarized emitted lamp light to the LCOS display array 410. LCOS display array 410 is positioned to receive and selectively reflect lamp light to generate CGI light to be sent along forward optical path 445. In a color sequential configuration, illumination module 405 would sequentially provide red, green, and blue light to a color sequential LOCS array and the CGI light generated by the color sequential LCOS array would include color sequential images. If display module 423 includes LCD technology, an LCD would selectively manipulate the provided lamp light (from a backlight) to generate CGI. Still referring to the illustrated embodiment, S-polarized emitted lamp light would be rotated 90 degrees to P-polarized light by LCOS display array 410. Hence, the CGI light sent along forward optical path 445 may be P-polarized CGI light, as notated in FIG. 4.

The P-polarized CGI light generated by LCOS display array 410 is received by light relay 475, in FIG. 4. After traveling through light relay 475, the P-polarized CGI light encounters beam splitter 425 along forward optical path 445. Beam splitter 425 directs a portion (e.g. 50%) of the CGI light toward the external scene-side of eyepiece 400, while a portion (e.g. 50%) of the CGI light is passed toward end reflector 430. It is appreciated that not all of the light paths (e.g. CGI light directed by beam splitter 425 toward the external scene-side of eyepiece 400) are shown in FIG. 4, as to not obscure the invention. The CGI light passed by beam splitter 425 reflects off end reflector 430 and encounters beam splitter 425 and a portion of the CGI light is directed toward eye 460 by beam splitter 425, while the other portion is passed by beam splitter 425.

Beam splitter 425 also serves to direct ambient light 465 (from the external scene-side of eyepiece 400) into light relay 475. As illustrated, beam splitter 425 may direct ambient light 465 through light relay 475 in a substantially opposite direction as forward optical path 445. The illustrated dashed line that depicts examples of light paths that ambient light 465 may travel include additional vertical arrows to indicate that ambient light 465 may be scattered in light relay 475 and within portions of display module 423. The illustrated portion of ambient light 465 that initially passes through beam splitter 425 may reflect off of eye 460, encounter beam splitter 425 and be directed to end reflector 430, and then be reflected toward LCOS display array 410.

Photodetectors 220A, B, C, D, and E are possible locations for photodetector 220. Other photodetector locations are possible.

Photodetector 220A is optically coupled to receive that ambient light 465 from light relay 475 that is traveling in a substantially opposite direction as the CGI light traveling along forward optical path 445. Additionally, photodetector 220A may detect scattered portions of ambient light 465 at coming from different angles. Photodetector 220A may be disposed in the same semiconductor substrate as LCOS display array 410. It is appreciated that photodetector 220A is positioned to receive both RGB lamp light from illumination module 405, and positioned to receive ambient light 465.

Photodetector 220B is disposed behind light source 407. In one embodiment, Photodetector 220B is positioned behind a package that houses an RGB LED and measures the RGB lamp light leaking through the RGB LED package body. Photodetector 220C is positioned facing PBS 420. Photodetector 220C may measure RGB lamp light diffusion through the border of light source 407. Depending on the exact position of photodetector 220C, it may also be able detect scattered ambient light 465. Photodetector 220D is optically coupled to receive ambient light 465 from light relay 475. Photodetector 220D may be disposed perpendicular to light relay 475 and measure diffuse reflections of ambient light 465 within light relay 475. Photodetector 220D may be optically coupled to light relay 475 at an angle (e.g. 45 degrees) to measure ambient light 465. Photodetector 220E is disposed behind end reflector 430, in the illustrated embodiment. In this embodiment, end reflector 430 includes a hole and photodetector 220E is optically coupled to receive ambient light 465 through the hole.

Figure 5:
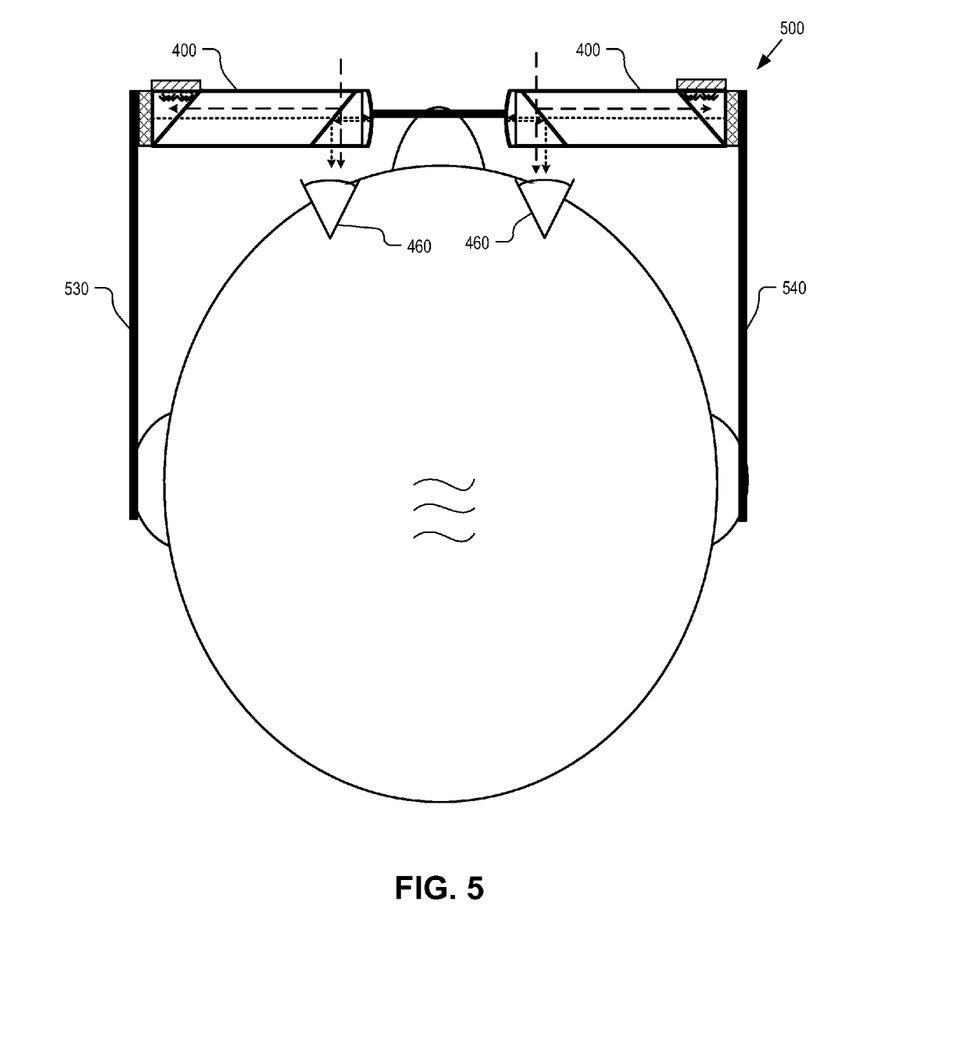
FIG. 5 is a top view of a user wearing a binocular HMD implanted with eyepieces, in accordance with an embodiment of the disclosure, in accordance with an embodiment of the disclosure.

FIG. 5 is a top view of a user wearing a binocular HMD implanted with eyepieces 400, in accordance with an embodiment of the disclosure, in accordance with an embodiment of the disclosure. HMD 500 includes left temple arm 530 and right temple arm 540 positioned above the user's ears. Eyepieces 400 are positioned to project CGI light into eyes 460 of a user of the HMD. Although FIG. 5 illustrates a binocular HMD having two of eyepiece 400, one for each eye 460, an HMD may also be implemented as a monocular HMD including only a single eyepiece positioned to project CGI to a single eye 460. And, HMD 500 is illustrated as being implanted with eyepieces 400, however, an HMD may be implanted with eyepieces that incorporate alternative technologies discussed in the FIGS. 2-4 that may not be present in the illustrated embodiment of eyepiece 400.

Figure 6:
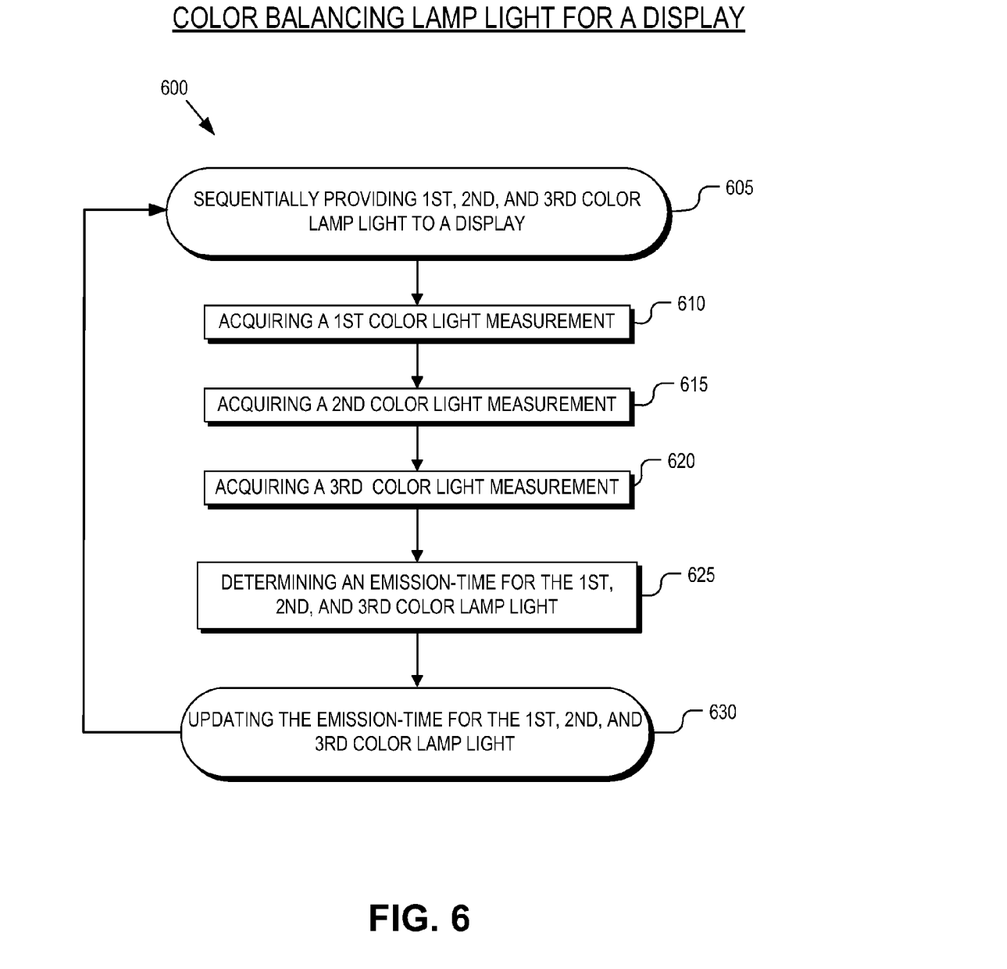
FIG. 6 is a flow chart illustrating an example process of operation for color balancing lamp light for a display that may be utilized by an HMD, in accordance with an embodiment of the disclosure.

FIG. 6 is a flow chart illustrating an example process 600 of operation for color balancing lamp light for a display that may be utilized by an HMD, in accordance with an embodiment of the disclosure. The order in which some or all of process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, first, second, and third color lamp light is sequentially provided to a display array (e.g. LCOS display array 410) of the HMD. Only one of the first, second, and third color lamp light (e.g. red light 335, green light 345, and blue light 355) is sequentially provided at one time. In process block 610, a first light measurement of the first color lamp light is acquired while the first color lamp light is provided to the display array. A second light measurement of the second color lamp light is acquired while the first color lamp light is provided to the display array (process block 615). In process block 620, a third light measurement of the third color lamp light is acquired while the third color lamp light is provided to the display array. Photodetector 220 and ADC module 219 may be used to acquire the light measurements and controller 105 may coordinate the measurements with sequentially cycling red LED 213, green LED 215, and blue LED 217.

In process block 625, an emission-time for each of the first, second, and third color lamp light is determined based on the first, second, and third light measurement, respectively. Determining the emission-times for the first, second, and third color lamp light may also be based on previous first, second, and third light measurements of previously provided first, second, and third color lamp light. The emission-times for the first, second, and third color lamp light may be determined in order to color balance the lamp light according to a pre-determined white point. The emission-times for the first, second, and third color lamp light are updated (process block 630) and the process may return to process block 605 and sequentially re-provide the first, second, and third color lamp light to the display with update emission-times.

Figure 7:
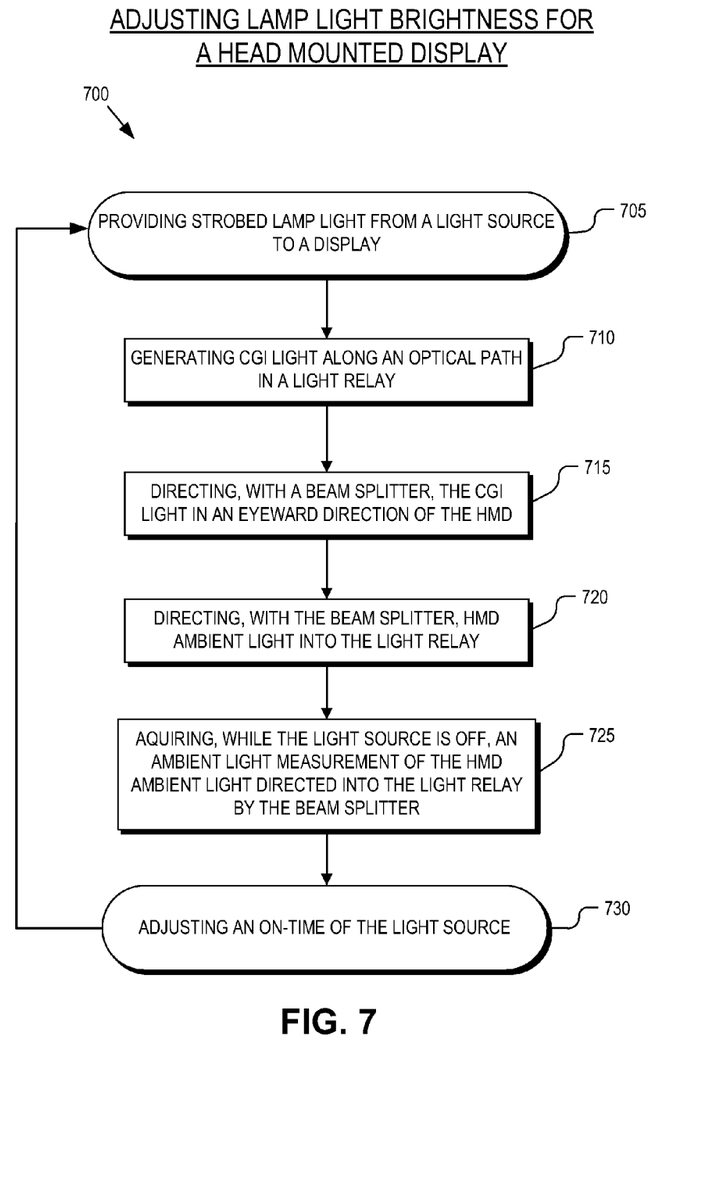
FIG. 7 is a flow chart illustrating an example process of operation for adjusting lamp light brightness for a display that may be utilized in an HMD, in accordance with an embodiment of the disclosure.

FIG. 7 is a flow chart illustrating an example process of operation for adjusting lamp light brightness for a display that may be utilized in an HMD, in accordance with an embodiment of the disclosure. The order in which some or all of process blocks appear in process 700 should not be deemed limiting. Rather, one of ordinary skill in the art having the benefit of the present disclosure will understand that some of the process blocks may be executed in a variety of orders not illustrated, or even in parallel.

In process block 705, strobed lamp light from a light source (e.g. light source 407) is provided to a display (e.g. LCOS display array 410) of an HMD. In process block 710, CGI light is generated along an optical path in a light relay (e.g. light relay 475), when the light source is ON. A beam splitter (e.g. beam splitter 425) directs the CGI light in an eyeward direction of the HMD, when the light source is on (process block 715). In process block 720, the beam splitter directs HMD ambient light into the light relay. In one embodiment, the beam splitter directs the HMD ambient light from an external scene side of the HMD that is opposite of an eyeward side of the HMD.

While the light source is OFF, an ambient light measurement of the HMD ambient light (e.g. ambient light 465) that is directed into the light relay (by the beam splitter) is acquired (process block 725). In process block 730, an ON-time of the light source is adjusted based on the ambient light measurement. The ON-time of the light source may be adjusted to change a brightness level of the CGI light. Adjusting the ON-time of the light source may also be based on one or more previous ambient light measurements. In one embodiment, the light source is an RGB LED and ON-times of the red, green, and blue LED are adjusted by a same scale factor based on the ambient light measurement. After process block 730, process 700 may return to process block 705 to strobe lamp light with an adjusted ON-time.

It is appreciated that at least portions of process 700 may be included in process 600 in some embodiments. For example, process 600 may further include coordinating a fourth light measurement of HMD ambient light that has been directed into a light relay optically coupled to receive color sequential images from the display array. The fourth light measurement may be made by a photodetector while the first, second, and third color lamp light is not provided to the display, thus measuring the ambient light. The same photodetector may be used for the first, second, and third light measurements. Determining the emission time for each of the first, second and third color lamp light may be further based on the fourth light measurement, in addition to the first, second, and third light measurement.

In one embodiment, one photodetector (e.g. photodetector 220A) is positioned to measure both sequential RGB lamp light and the ambient light of an HMD. In this embodiment, adjusting the color balance of lamp light according to a pre-determined white point and adjusting lamp light according to ambient light of an HMD may be accomplished using the same electronic components. This embodiment may save on component costs. When a beam splitter directs the ambient light to the photodetector (that also measure the sequential RGB lamp light), it may obviate the need to include an opening in the HMD to house a second photodiode to detect ambient light.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of color balancing an illumination source of a display array, the method comprising:
   sequentially providing first, second, and third color lamp light to the display array, wherein only one of the first, second, and third color lamp light is sequentially provided to the display array at one time;
   acquiring a first light measurement of the first color lamp light, while the first color lamp light is provided to the display array;
   acquiring a second light measurement of the second color lamp light, while the second color lamp light is provided to the display array;
   acquiring a third light measurement of the third color lamp light, while the third color lamp light is provided to the display array;
   acquiring a fourth light measurement of ambient light, wherein the fourth light measurement is made while the first, second, and third color lamp light are not provided to the display array, and wherein the first, second, third, and fourth light measurement are measured by one photodetector;
   determining an emission-time for each of the first, second, and third color lamp light, based on the first, second, third, and fourth light measurements, respectively; and
   sequentially re-providing the first, second, and third color lamp light to the display array according to the emission-time determined for each of the first, second, and third color lamp light.

2. The method of claim 1, wherein the ambient light is head mounted display ("HMD") ambient light that was directed into a light relay of the HMD by a beam splitter, wherein the light relay is optically coupled to receive color sequential images from the display array and deliver the color sequential images to a viewing end of the light relay for presenting to an eye of a user, when the HMD is worn.

3. The method of claim 1, wherein the determining the emission-time for the each of the first, second, and third color lamp light further based on the fourth light measurement produces a scale factor to be applied to the emission-time for the each of the first, second, and third color lamp light.

4. The method of claim 1, wherein determining the emission-time for the each of the first, second, and third color lamp light is further based on a previous first, second, and third light measurement of previous provided first, second, and third color lamp light, respectively.

5. The method of claim 1, wherein determining the emission-time for the first, second, and third color lamp light color balances a light source to a pre-determined white point.

6. The method of claim 1, wherein sequentially providing the first, second, and third color lamp light to the display array occurs at a frequency sufficiently high enough to avoid having an eye of a viewer of the display array perceive flicker.

7. At least one non-transitory machine-accessible storage medium having instructions stored therein that, when executed by a head mounted display ("HMD"), will cause the HMD to perform operations comprising:
   sequentially providing first, second, and third color lamp light to a display array of the HMD, wherein only one of the first, second, and third color lamp light is sequentially provided to the display array at one time;
   acquiring a first light measurement of the first color lamp light, while the first color lamp light is provided to the display array;

acquiring a second light measurement of the second color lamp light, while the second color lamp light is provided to the display array;

acquiring a third light measurement of the third color lamp light, while the third color lamp light is provided to the display array;

acquiring a fourth light measurement of HMD ambient light that has been directed into a light relay optically coupled to receive color sequential images from the display array, wherein the fourth light measurement is made while the first, second, and third color lamp light are not provided to the display array, the first, second, third, and fourth light measurement measured by one photodetector;

determining an emission-time for each of the first, second, and third color lamp light, based on the first, second, third, and fourth light measurements, respectively; and sequentially re-providing the first, second, and third color lamp light to the display array according to the emission-time determined for the each of the first, second, and third color lamp light.

8. The at least one non-transitory machine-accessible storage medium of claim 7, wherein the determining the emission-time for the each of the first, second, and third color lamp light further based on the fourth light measurement produces a scale factor to be applied to the emission-time for the each of the first, second, and third color lamp light.

9. The at least one non-transitory machine-accessible storage medium of claim 7, wherein the HMD ambient light is directed into the light relay by a beam splitter.

10. The at least one non-transitory machine-accessible storage medium of claim 7, wherein determining the emission-time for the each of the first, second, and third color lamp light is further based on a previous first, second, and third light measurement of previous provided first, second, and third color lamp light, respectively.

11. The at least one non-transitory machine-accessible storage medium of claim 7, wherein sequentially providing the first, second, and third color lamp light to the display array occurs at a frequency greater than 60 Hz.

12. A method of operating a head mounted display ("HMD"), the method comprising:

providing strobed lamp light from a light source to a display array of the HMD;

generating computer generated image ("CGI") light along an optical path in a light relay when the light source is ON;

directing, with a beam splitter, the CGI light in an eyeward direction of the HMD when the light source is ON;

directing, with the beam splitter, HMD ambient light into the light relay;

acquiring, while the light source is OFF, an ambient light measurement of the HMD ambient light directed into the light relay by the beam splitter; and adjusting an ON-time of the light source based on the ambient light measurement, to change a brightness level of the CGI light.

13. The method of claim 12, wherein adjusting the ON-time of the light source is further based on a previous ambient light measurement that was prior to the ambient light measurement.

14. The method of claim 12, wherein the light source includes a red, green, and blue light emitting diode ("LED") and adjusting the ON-time of the light source includes adjusting, by a same scale factor, a red ON-time, a green ON-time, and a blue ON-time of the red, green, and blue LED, respectively.

15. The method of claim 12, wherein the beam splitter directs the HMD ambient light from an external scene side of the HMD that is opposite an eyeward side of the HMD.

16. At least one non-transitory machine-accessible storage medium having instructions stored therein that, when executed by a head mounted display ("HMD"), will cause the HMD to perform operations comprising:

providing strobed lamp light from a light source to a display array of the HMD;

generating computer generated image ("CGI") light along an optical path in a light relay when the light source is ON;

directing, with a beam splitter, the CGI light in an eyeward direction of the HMD when the light source is ON;

directing, with the beam splitter, HMD ambient light into the light relay;

acquiring, while the light source is OFF, an ambient light measurement of the HMD ambient light directed into the light relay by the beam splitter; and adjusting an ON-time of the light source based on the ambient light measurement, to change a brightness level of the CGI light.

17. The at least one non-transitory machine-accessible storage medium of claim 16, wherein adjusting the ON-time of the light source is further based on a previous ambient light measurement that was prior to the ambient light measurement.

18. The at least one non-transitory machine-accessible storage medium of claim 16, wherein the light source includes a red, green, and blue light emitting diode ("LED") and adjusting the ON-time of the light source includes adjusting, by a same scale factor, a red ON-time, a green ON-time, and a blue ON-time of the red, green, and blue LED, respectively.

19. The at least one non-transitory machine-accessible storage medium of claim 16, wherein the beam splitter directs the ambient light from an external scene side of the HMD that is opposite an eyeward side of the HMD.

* * * * *